United States Patent [19]

Cooper

[11] Patent Number: 5,666,016
[45] Date of Patent: Sep. 9, 1997

[54] WINDING SUPPORT FOR A ROTARY ELECTRICAL COMPONENT

[75] Inventor: John Cooper, Hemel Hempstead, United Kingdom

[73] Assignee: Lucas Industries PLC, Great Britain

[21] Appl. No.: 611,412

[22] Filed: Mar. 5, 1996

[30] Foreign Application Priority Data

Mar. 14, 1995 [GB] United Kingdom .............. 9505072

[51] Int. Cl.$^6$ ........................................ H02K 3/46
[52] U.S. Cl. ................... 310/270; 310/59; 310/61
[58] Field of Search .................... 310/260, 270, 310/61, 58, 54, 65, 269, 194, 201

[56] References Cited

U.S. PATENT DOCUMENTS

| | | | |
|---|---|---|---|
| 2,618,756 | 11/1952 | Fechheimer | 310/54 |
| 3,984,714 | 10/1976 | Grozinger et al. | 310/94 |
| 3,991,333 | 11/1976 | Laskaris | 310/52 |
| 4,143,290 | 3/1979 | Mizukami et al. | 310/270 |
| 4,525,642 | 6/1985 | Humphries et al. | 310/260 |
| 5,177,392 | 1/1993 | Scott | 310/268 |
| 5,300,845 | 4/1994 | Fanning et al. | 312/217 |
| 5,300,847 | 4/1994 | Haditsch | 310/61 |

*Primary Examiner*—Clayton E. LaBalle
*Assistant Examiner*—Timothy A. Williams
*Attorney, Agent, or Firm*—Barnes & Thornburg

[57] ABSTRACT

A winding support for a rotary electrical component has axially extending poles and a plurality of windings which are wound on the poles so as to project beyond axial ends of the poles spaced apart in the direction of an axis of rotation of the rotary electrical component. The winding support comprises a first part formed from insulative material having spaced apart fingers to be positioned in respective spaces between the windings projecting beyond an axial end of one said pole and a second part arranged to be fastened to the first part for holding the windings in place relative to the first part. The first part preferably comprises a separator member having the spaced apart fingers thereon and a support member for the separator member arranged outboard of and formed of a different material from the separator member.

20 Claims, 4 Drawing Sheets

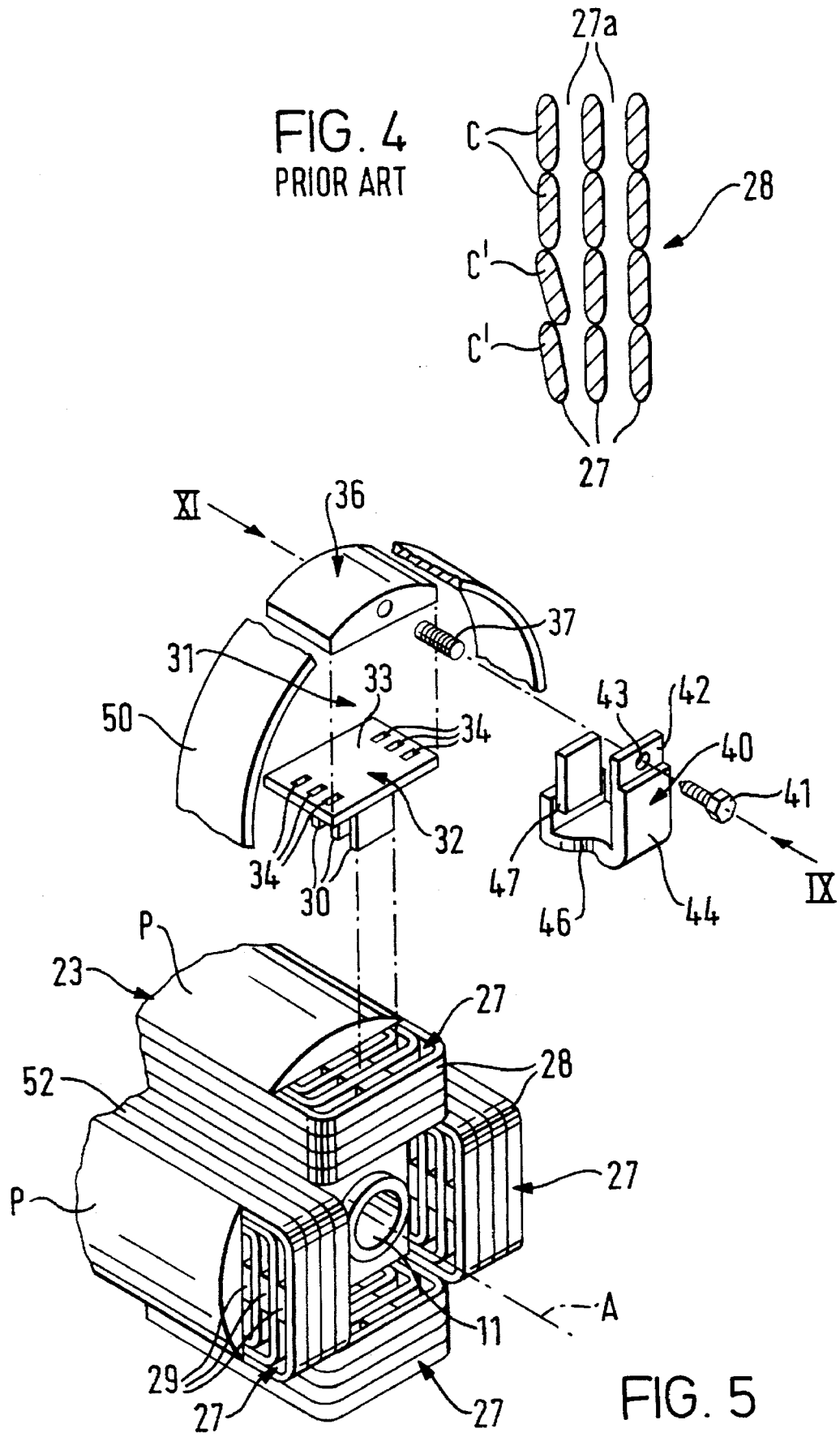

WINDING SUPPORT FOR A ROTARY ELECTRICAL COMPONENT

The invention relates to a winding support for a rotary electrical component for example a rotor of a brushless generator.

The invention is primarily concerned with a winding support for use on a rotary component of an aircraft electric generator of the kind which is designed to run at 12000 rpm (to provide 400 Hz).

Figure 1:
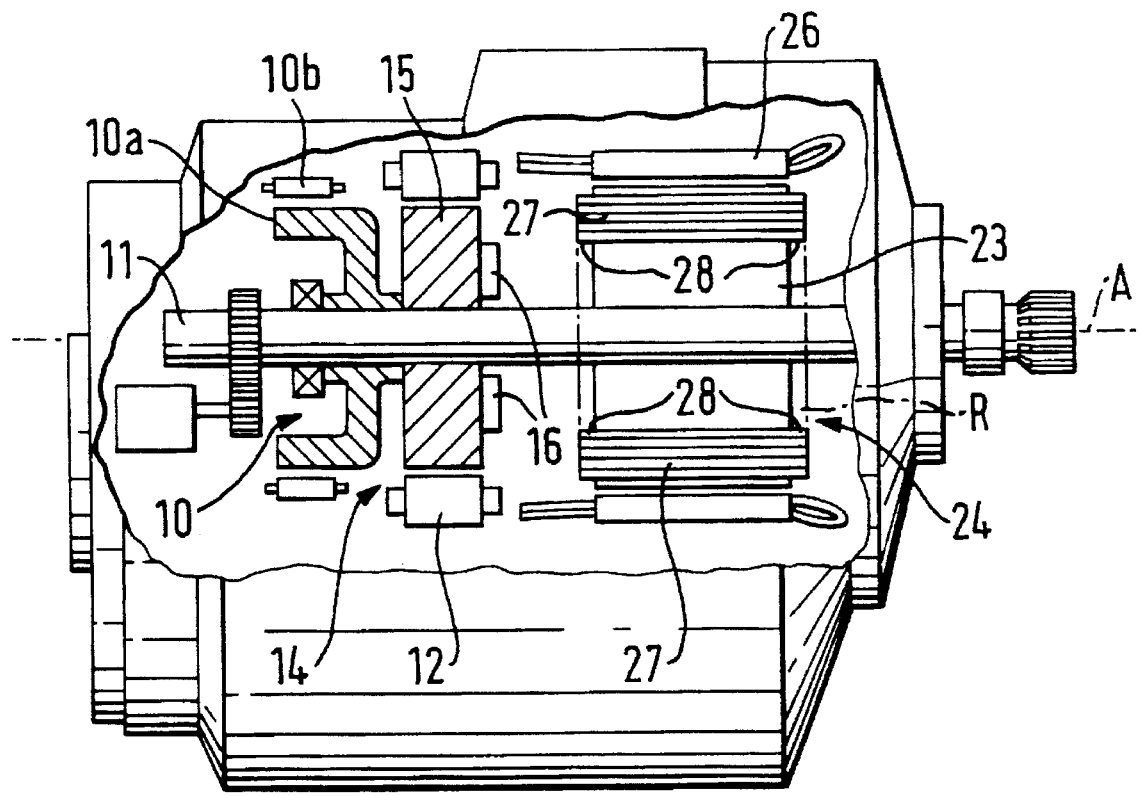
Figure 2:
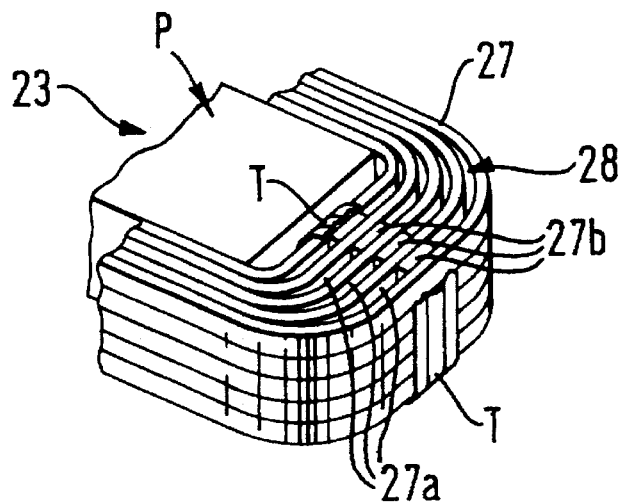
Figure 3:
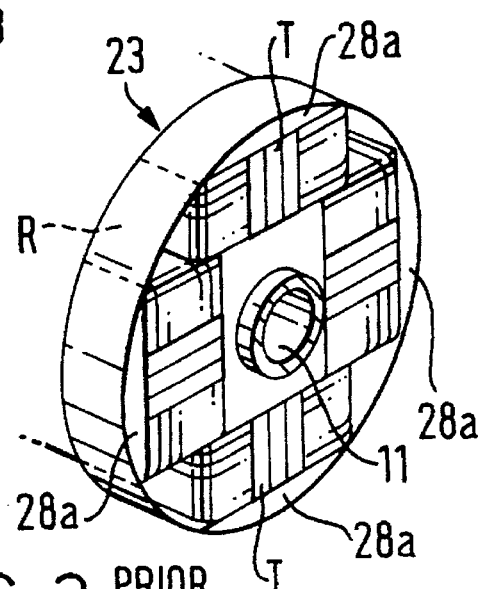

Reference is made to FIGS. 1 to 4 in which:

FIG. 1 is a diagrammatic cross-section through a known type of brushless generator of the foregoing kind, FIG. 2 is a perspective view of part of a rotor of the generator shown in FIG. 1, FIG. 3 is a diagrammatic perspective view of one end of the rotor showing the way in which winding overhangs are supported and FIG. 4 is a diagrammatic cross-section view through windings of an overhand showing the way in which the windings can tend to slide one over the other as a result of centrifugal force during operation of the generator.

The brushless generator of FIG. 1 comprises a permanent magnet generator 10 (having a rotor 10a and a stator 10b) which supplies current to a stator 12 of an exciter generator 14. Alternating current is induced in a rotor 15 of the exciter generator 14 and is supplied via a rectifier arrangement 16 to a rotor 23 of a main generator 24. Output power from the main generator 24 is derived from a stator 26 having windings which co-operate with the rotating magnetic field provided by the rotor 23. The rotors 10a, 15 and 23 are rotated by a tubular drive shaft 11 in known manner. The rotor 23 of the main generator 24 is typically a four-pole type having four sets of windings 27 (two sets of which are shown in FIG. 1) which project beyond the ends of the rotor 23 to form overhangs 28. Where the windings 27 forming the overhangs 28 pass around the ends of the poles (indicated at P) they are wound so as to define spaces 27a therebetween in the direction of the axis of rotation, indicated at A. The spaces 27a are maintained by insulative spacers 27b between the windings 27 to allow cooling oil to flow over the windings forming the overhangs 28. Cooling oil passes through the hollow drive shaft 11 and escapes through one or more radial apertures (not shown) in the drive shaft, the oil eventually reaching the overhangs 28 and passing primarily through those parts of the spaces 27a not occupied by the spacers 27b. With the spacers 27b in position, the windings 27 at the overhangs 28 are secured by means of tape T (shown broken away in FIG. 2) wound thereon and are finally impregnated with varnish. The overhangs 28 are supported by four insulated coil supports 28a held in place by a metal banding ring R (shown in broken lines in FIG. 1) which surrounds the coil supports 28a. Unfortunately, such a method of forming the overhangs 28 does not provide adequate support for the individual conductors C of the windings 27 during rotation at high speeds. As shown in FIG. 4, the individual conductors C are generally flat with rounded edges in contact with each other. During high speed rotation, there is a risk with the prior art method of support that the conductors C can slip one over another as indicated at C' which is undesirable.

An object of the present invention is to provide a support for windings on a rotary electrical component which minimises the foregoing problem.

According to one aspect of the invention there is provided a winding support for a rotary electrical component having axially extending poles and a plurality of windings which are wound on the poles so as to project beyond the ends thereof spaced apart in the direction of an axis of rotation of the rotary electrical component, the winding support comprising a first part formed from insulative material having spaced apart fingers to be positioned in the respective spaces between the windings at an axial end of one said pole and a second part arranged to be fastened to the first part for holding the windings in place relative to the first part.

With such an arrangement, the windings are held more firmly than hitherto.

The first part is preferably formed with a passageway for receiving cooling oil after it has passed through the spaces between the windings to enable the cooling oil to flow into contact with an adjacent element of the rotary electrical component.

The first part may comprise a separator member having the spaced apart fingers thereon and a support member for the separator member positioned radially outboard of the separator member. The use of a separate support member enables the material of the support member to be chosen from a range of materials different from that forming the separator member. For example, an insulative material used for the separator member is ideally formed from a suitable plastics material whereas the material forming the support member to which the second part is fastened may be selected from a different material, eg aluminium, which is more suited to mounting the second part.

The separator member may comprise a plate of material having the spaced apart fingers projecting therefrom.

The separator member may include passageways for cooling oil. Where the aforesaid plate is provided, the passageways may be defined by the plate.

The support member preferably has a surface which lies against the separator member. In the preferred embodiment, that surface of the support member lies, in use, against the aforesaid plate of the separator member.

The support member is preferably formed with a passageway for receiving cooling oil after it has passed through the spaces between the windings to enable the cooling oil to flow into contact with an adjacent component such as windings of a stator.

The support member preferably has a cylindrical circumference around which a retention means can pass.

Preferably the second part is fastened to the support member. The second part preferably includes a first section used to mount the second part on the support member and a second section arranged to extend around radially inner edges of the windings projecting beyond the ends of the component. The provision of such a second section is most useful in helping to provide support for the windings projecting beyond the ends of the poles. The second section may include a radial part extending radially across one axial end of the spaced apart windings, a part extending from the radial part axially of the rotary electrical component inboard of the spaced apart windings and a further part extending into a space between an axial end surface of the associated pole and the windings.

The second part is preferably secured to the support member by means of a screw-threaded fastener. The fastener may screw into a helical insert housed within the support member. The helical insert is useful where the material of the support member is softer than that of the fastener, the helical member normally being formed of a hardened steel.

Retention means, for example in the form of a band, may be positioned, in use, radially outboard of the first part and in contact therewith so as to resist radially outward movement of the first part. Where a plurality of poles is provided, the retention means preferably extends, in use, circumferentially around all the said first parts.

The aforesaid retention means may locate in a channel, the channel preferably having a base defined by the outer surface of the first part and respective walls defined by the aforesaid second part of the winding support and an end part of the associated pole. Such an arrangement provides a particularly secure location for the band.

Figure 13:
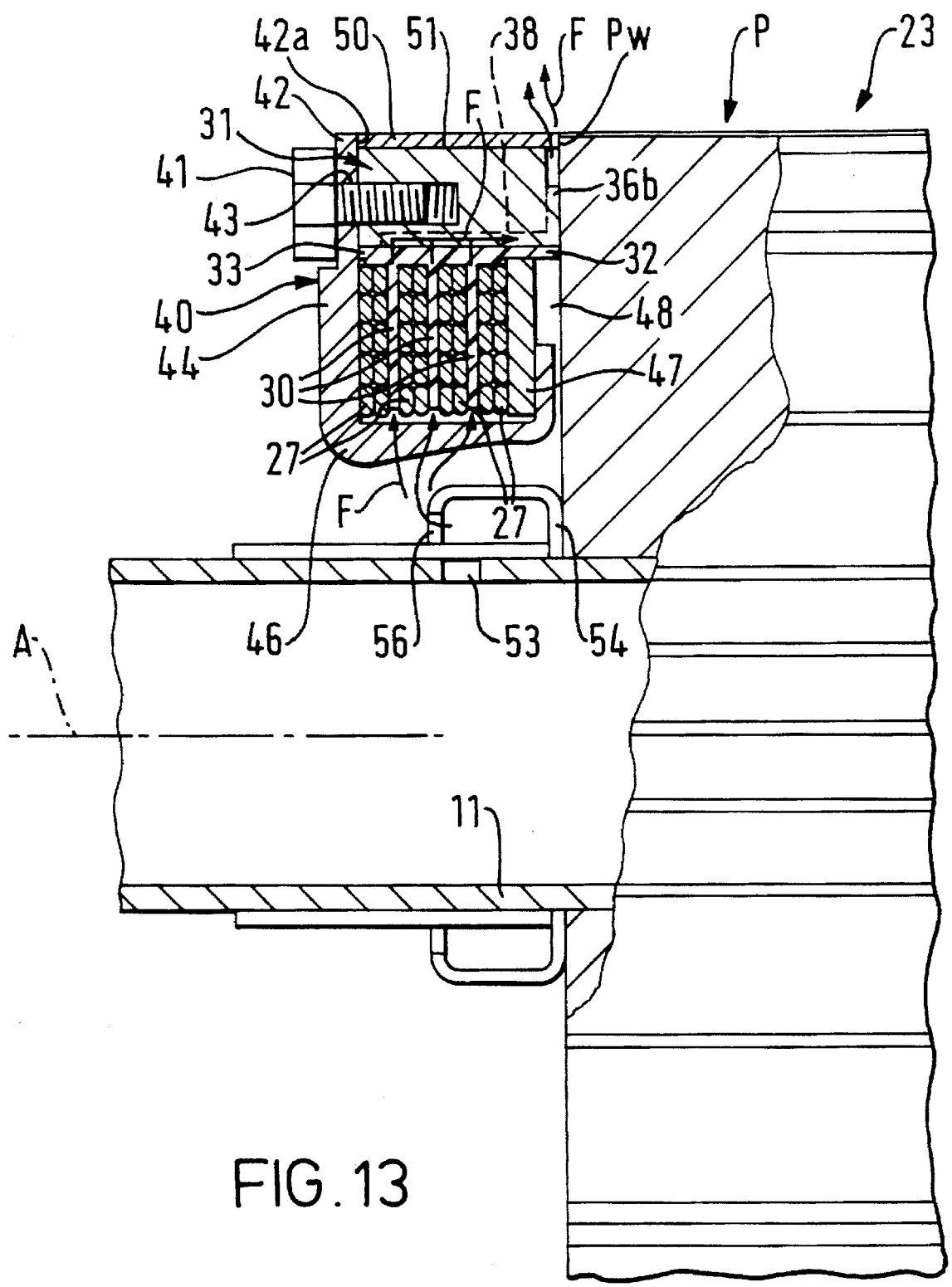
Figure 6:
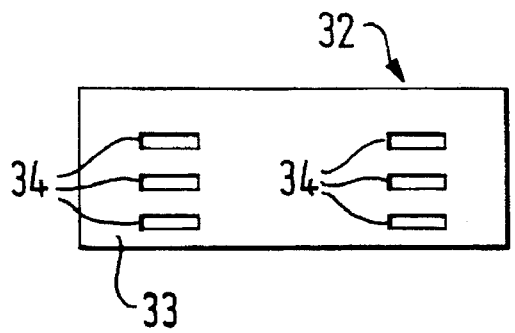
Figure 7:
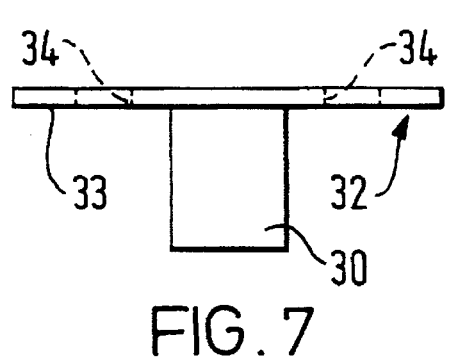
Figure 8:
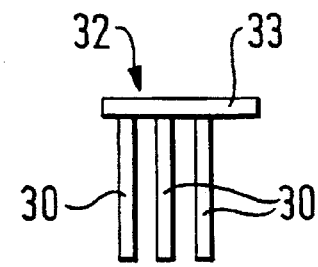
Figure 9:
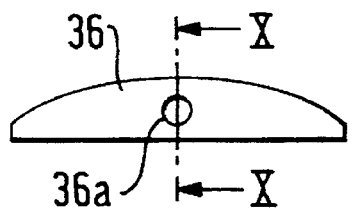
Figure 11:
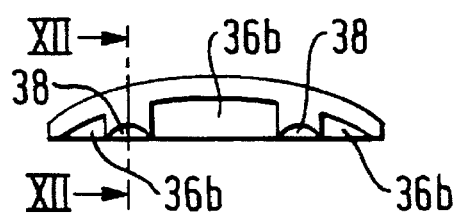
Figure 10:
Figure 12:
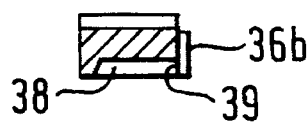
Figure 14:
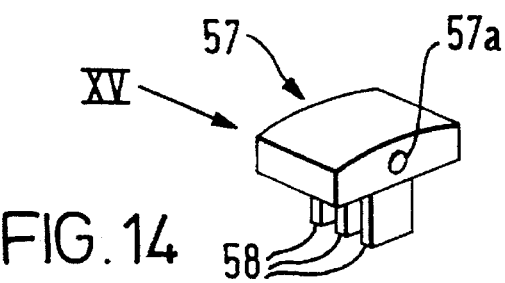
Figure 15:
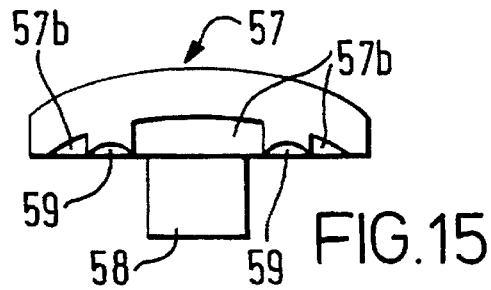

A winding support in accordance with the invention will now be described by way of example with reference to the remaining accompanying drawings in which:

FIG. 5 is a perspective view of part of the rotor 23 shown in FIG. 1 and an exploded view of a winding support in accordance with the invention, FIGS. 6, 7 and 8 are plan, end and side elevations respectively of a separator member of the winding support, FIG. 9 is an end view of a support member shown in FIG. 5 looking in the direction of arrow IX in FIG. 5, FIG. 10 is a cross section of the support member shown in FIG. 9 on the line X—X in FIG. 9, FIG. 11 is another end view of the support member shown in FIG. 5 looking in the direction of arrow XI in FIG. 5, FIG. 12 is a cross section of the support member shown in FIG. 11 on line XII—XII in FIG. 11, FIG. 13 is an axial cross section of part of the rotor shown broken away and illustrating the assembled winding support in accordance with the invention, FIG. 14 is a perspective view of a one piece support and separator member and FIG. 15 is an end view of the one piece support and separator member shown in FIG. 14 looking in the direction of arrow XV in FIG. 14.

In the drawings parts corresponding to parts shown in FIGS. 1 to 4 carry the same reference numerals.

Looking at FIG. 5, it can be seen that the windings 27 are symmetrically arranged on four poles P (two adjacent poles being visible). During the winding process, steel strips indicated at 29 are positioned so that spaces 27a will be formed between the windings 27 in the direction of the axis of rotation A of the rotor 23 whereby the windings form the overhangs 28. After the winding process has been completed, the metal strips 29 are removed.

Fingers 30 of a separator member 32 are then inserted into the spaces 27a. The separator member 32 is formed from plastics material and the fingers 30 are moulded in one piece with a plate 33 formed with cooling oil apertures 34. The separator member 32 can be seen in detail in FIGS. 6 to 8. Once each separator member 32 has been placed in position, a support member 36 is placed against the radially outer surface of the plate 33. The separator member 32 and the support member 36 together constitute the aforesaid "first part" of the winding support indicated generally at 31 in FIGS. 5 and 13.

The support member 36 has a helical steel insert 37 therein which defines an internal screw-thread. As shown in FIGS. 9 to 12, the support member 36 is formed with a hole 36a for receiving the insert 37 and is formed with two axially extending channels 38. The support member 36 is also formed with three projections 36b. Once the separator member 32 and support member 36 have been placed in position, a winding retainer 40, constituting the aforesaid second part, is fastened to the support member 36 in a manner which will be described with respect to FIG. 13. The winding retainer 40 may be formed from a metal material such as aluminium.

In FIG. 13, the fingers 30 of the separator member 32 are shown in position between the spaced apart windings 27 at the overhang 28, the windings being arranged in spaced apart sets of ten windings. The plate 33 of the separator member 32 is pushed firmly against the radially outer edges of the sets of windings and the flat radially inner surface of the support member 36 is placed against the plate 33. The winding retainer 40 is then placed in position.

As will be appreciated, the winding retainer 40 comprises a first section 42 formed with an aperture 43 which receives a bolt 41 used to screw the retainer 40 to the support member 36, the bolt 41 screwing into the insert 37. The winding retainer 40 includes a second section which is U-shaped and comprises a radial part 44 which is directed inwardly past the axially outer winding 27, a part 46 which extends axially past the radially inner ends of the windings 27 and a further part 47 which extends radially outwardly through a space 48 between one end of the associated pole P and the adjacent winding 27. The axially spaced windings 27 with the fingers 30 there between are then held firmly between the parts 44, 47 of the winding holder 40. The winding retainer 40 holds the windings 27 particularly firmly against relative axial movement and is much more effective than the tape T in preventing sliding movement of the windings as illustrated in FIG. 4.

A retention member in the form of a steel band 50 is then placed in position so as to extend around the outer surfaces of the four support members 36. Conveniently, it will be noted that the first section 42 of the winding retainer 40 projects radially outwardly beyond the cylindrical radially outer surface of the support member 36 to form a wall 42a. The radially outer surface of the support member 36 lies radially inboard of the radially outer surface of the pole P which forms a further wall Pw. The walls 42a, Pw and the radially outer surface of the support member 36 thereby define a channel 51 in which the band 50 locates. Wedges (not shown) are placed in position in known manner in spaces indicated at 52 in FIG. 5.

In use, cooling oil within the drive shaft 11 escapes through a radial port 53 in the drive shaft 11 and enters a catcher 54. The oil exits the catcher 54 through an opening 56 and travels outwardly as indicated at F by centrifugal action to the overhangs 28. The oil travels outwardly primarily through parts of the spaces 27a not occupied by the fingers 30, out of the apertures 34 in the separator member 32 and into the channels 38 in the support member 36. The oil then travels along the channels 38 to the right as viewed in FIG. 13 and exits through respective open ends 39 (see FIG. 12). The support member 36 is spaced from the adjacent pole P by the projections 36b so that the oil can escape from the right hand end of each passageway 38 and travel outwardly to cool windings of the stator 26. The oil flow path is indicated by arrows F in FIG. 13.

We prefer to make the separator member 32 and the support member 36 as separate units as that enables the material of the support member to be chosen from a range of materials different from that forming the insulative material of the separator member as mentioned above which can be particularly advantageous. However, if desired, the separator member 32 and the support member 36 can be made as a single part as shown in FIGS. 14 and 15. In those Figures, the single part separator/support unit is indicated at 57 and is formed with a hole 57a for receiving the insert 37 to facilitate attachment of the winding retainer 40 as previously described. Fingers 58 are provided for positioning in the spaces 27a between the windings 27. In FIG. 12 it can be seen that the underside of the separator/support unit 57 is formed with two spaced apart channels 59 similar to the channels 38 to provide a flow path for cooling oil. Also, projections 57b similar to projections 36b are provided.

I claim:

1. A winding support for a rotary electrical component, the rotary electrical component being rotatable about an axis of rotation and having poles extending in the direction of the axis of rotation and a plurality of windings which are wound on the poles so as to project beyond axis ends of the poles, the windings projecting beyond the axial ends of the poles being spaced apart in the direction of the axis of rotation of the rotary electrical component, the winding support comprising a first part formed from insulative material having spaced apart fingers to be positioned in respective spaces between the windings where the windings project beyond an axial end of one said pole and a second part to be fastened to the first part for holding the windings in place relative to the first part thereby securing the windings against movement relative to each other in the direction of the axis of rotation.

2. A winding support according to claim 1 in which the first part is formed with a passageway through which cooling oil flows after it has passed between the windings.

3. A winding support according to claim 1 in which the first part has a cylindrical circumference.

4. A winding support according to claim 1, in which the first part comprises a separator member having the spaced apart fingers thereon and a support member for the separator member positioned radially outwardly of the separator member.

5. A winding support member according to claim 4 in which the separator member and the support member are made from different materials.

6. A winding support according to claim 5 in which the separator member comprises a plate of material having the spaced apart fingers projecting therefrom.

7. A winding support according to claim 6 in which the separator member includes a passageway for cooling oil.

8. A winding support according to claim 7 in which the separator member comprises a plate of material having the spaced apart fingers projecting therefrom and the passageway is formed in the plate.

9. A winding support according to claim 4 in which the support member is formed with a passageway for receiving cooling oil which passes through the separator member.

10. A winding support according to claim 9 in which the separator member comprises a plate of material having the spaced apart fingers projecting therefrom and said support member lies, in use, against the aforesaid plate of the separator member.

11. A winding support according to claim 4 in which the second part is fastened to the support member.

12. A winding support according to claim 1 in which the second part includes a first section used to mount the retainer on the first part and a second section arranged to extend around radially inner edges of the windings projecting beyond the end of said one pole.

13. A winding support according to claim 12 in which the second section includes a radial part extending radially across one axial end of the spaced apart windings, a part extending from the first part axially of the rotary electrical component inboard of the spaced apart windings and a further part extending into a space between an axial end surface of said one pole and the windings.

14. A winding support according to claim 11 in which the second part is secured to the support member by means of a screw-threaded fastener.

15. A winding support according to claim 1 in which retention means is positioned radially outwardly of the first part and in contact therewith so as to resist radially outward movement of the first part.

16. A winding support according to claim 15 in which the retention means extends circumferentially around the said first part.

17. A winding support according to claim 15 in which the retention means is band-like.

18. A winding support according to claim 17 in which the retention means is located in a channel which extends circumferentially around the said first part.

19. A winding support according to claim 18 in which the channel has a base formed by a cylindrical circumference of the first part and respective first and second walls defined by the said second part and an axial end of said one pole axially spaced from the first wall.

20. A rotary electrical component rotatable about an axis of rotation and having poles extending in the direction of the axis of rotation and a plurality of windings which are wound on the poles so as to project beyond axial ends of the poles, the windings projecting beyond the axial ends of the poles being spaced apart in the direction of the axis of rotation of the rotary electrical component, a winding support on the rotary electrical component comprising a first part formed from insulative material having spaced Apart fingers positioned in respective spaces between the windings where the windings project beyond an axial end of one said pole and a second part fastened to the first part holding the windings in place relative to the first part thereby securing the windings against movement relative to each other in the direction of the axis of rotation.

* * * * *